Aug. 29, 1967  N. R. SPARKS  3,339,176
DISCRIMINATING PRIMARY AND MULTIPLE SEISMIC REFLECTIONS
Filed March 14, 1966  3 Sheets-Sheet 1

NEIL R. SPARKS
INVENTOR.

BY Newell Pottorf
ATTORNEY

Aug. 29, 1967  N. R. SPARKS  3,339,176
DISCRIMINATING PRIMARY AND MULTIPLE SEISMIC REFLECTIONS
Filed March 14, 1966  3 Sheets-Sheet 2

NEIL R. SPARKS
INVENTOR.

BY Newell Pottoff

ATTORNEY

Aug. 29, 1967　　　　N. R. SPARKS　　　　3,339,176
DISCRIMINATING PRIMARY AND MULTIPLE SEISMIC REFLECTIONS
Filed March 14, 1966　　　　　　　　　　　　　3 Sheets-Sheet 3

NEIL R. SPARKS
INVENTOR.

BY Newell Potter
ATTORNEY

3,339,176
DISCRIMINATING PRIMARY AND MULTIPLE SEISMIC REFLECTIONS
Neil R. Sparks, Tulsa, Okla., assignor to Pan American Petroleum Corporation, Tulsa, Okla., a corporation of Delaware
Filed Mar. 14, 1966, Ser. No. 534,046
8 Claims. (Cl. 340—15.5)

ABSTRACT OF THE DISCLOSURE

In distinguishing primary and multiple seismic reflections two traces of seismic waves, received by a surface seismometer from two separate velocity-matching elongated charge detonations, respectively propagating upwardly and downwardly in a borehole below near-surface down-reflecting interfaces, are convolved, after removing first breaks. The resulting convolution trace shows events at the times of multiple, but not primary, reflections, and may therefore be used to identify or cancel the multiples in the trace made with downward propagation.

---

This invention relates to seismic geophysical surveying and is directed particularly to the discrimination of primary and multiple seismic reflections. More particularly, it is directed to a method for obtaining and processing seismic data so as to identify, reduce, or eliminate certain undesirable seismic multiple reflections, while leaving desired primary seismic reflections substantially undisturbed.

In geophysical surveying by the seismic reflection method, multiple reflections have long been recognized as a major source of interference and errors in interpreting the seismic data. A number of field-operating and data-analysis or interpretation procedures have been applied to identify, reduce, or eliminate these multiple reflections. These procedures have had only limited success, however, despite the fact that considerable time and effort have been expended in obtaining overlapping or multifold field data or in performing complex analysis and interpretation procedures. No single approach to the problem has been found successful in solving it for all cases.

The present invention is based on the fact that the generation of both primary and multiple seismic reflections can be regarded as convolution processes. This is fully explained in U.S. Patent 3,131,375 of R. J. Watson, and also by a technical publication by R. J. Watson in Geophysics, vol. 30, No. 1, February 1965, pp. 54 to 72. Accordingly, Watson utilizes a process including convolution steps to achieve a substantial cancellation of the multiples. As is clearly explained both in the patent and in the technical publication, however, that process is considered applicable only to multiples produced by downward reflection from the ground surface or from the base of the weathering. Furthermore, some uncertainty arises in making a proper choice of the surface reflection coefficient, the filtering effect of near-surface layers, and the shallow interfaces that are chiefly responsible for producing the strong multiples.

In view of the foregoing it is a primary object of my invention to provide a novel and improved method of discriminating primary reflections and those multiple seismic reflections involving down-reflection by subsurface interfaces as well as by the ground surface, and wherein a convolution step is utilized. A further object of the invention is to provide a method of discriminating primary and multiple seismic reflections by a combination of field-recording and subsequent record-interpretation procedures that, by automatically taking such factors into account, avoids any requirements for estimating reflection coefficients and filtering effects of the ground surface, near-surface layers, or subsurface interfaces. A still further object is to provide a novel and improved method of discriminating primary and multiple seismic reflections which avoids the expensive multifold coverage of prior-art procedures, and which is independent of any type of near-surface layering and subsurface velocity distribution. Other and further objects, uses, and advantages of the invention will become apparent as the description proceeds.

Briefly stated, the foregoing and other objects of the invention are accomplished by creating seismic waves successively along a given length of bore hole in the earth, at a depth below the down-reflecting interfaces most likely to be involved in producing multiple reflections, which interfaces thus include not only the ground surface and the weathering base, but may also include any additional reflecting interfaces below these near-surface ones. The resulting seismic waves are detected at a position generally vertically spaced from the location of wave generation, typically by means of one or more conventional seismometers placed at or below the ground surface or by a vertical detector spread in a bore hole. Preferably, the received waves are recorded in phonographically reproducible form.

From these received waves are then derived two directional-wave functions, which respectively represent the seismic waves that would be detected by the receiver while moving the position of successive wave creation along the given length of bore hole, in one case upwardly and in the other downwardly, at a velocity substantially matching the compressional seismic wave velocity in the earth formations adjacent the bore hole. These directional-wave functions are then modified by removing or omitting therefrom that portion which corresponds to the direct arrival of seismic waves at the receiver from the location of wave generation in the bore hole. After such modification, the two directional-wave functions are convolved with each other to produce a convolution function. It has been found that a convolution function so derived has events at times corresponding to seismic multiple reflections, but no corresponding events at times matching the times of occurrence of primary reflections except as a multiple and a primary reflection may happen to coincide. Accordingly, the convolution function so generated may be utilized to discriminate the primary and multiple seismic reflections by displaying for comparison two traces, one being the convolution function and the other the directional wave function that represents downward velocity-matching motion of the position of wave creation through the borehole length. Alternatively, the two functions to be compared may be subtracted with a number of different relative amplitudes, and the resulting difference or remainder traces may be displayed as an array of such traces, on which the multiple reflections may be observed to change amplitude across the array, while the primary reflections remain of constant amplitude.

The seismic waves may be generated within the bore hole in several different ways. Individual explosive charges may be separately detonated at a plurality of points spaced through the given length of bore hole, a record of all of the resulting waves being reproducibly recorded for each separate charge detonation. Alternatively, the directional wave functions may be directly generated by detonating two elongated velocity-matching explosive charges or two velocity-matching arrays of spaced charges, in one case from the bottom of the charge array upwardly, and in the other case from the top or uppermost of the charges downwardly.

This will be better understood by reference to the accompanying drawings forming a part of this application and illustrating certain typical and preferred embodiments of the invention. In these drawings.

Figure 1:
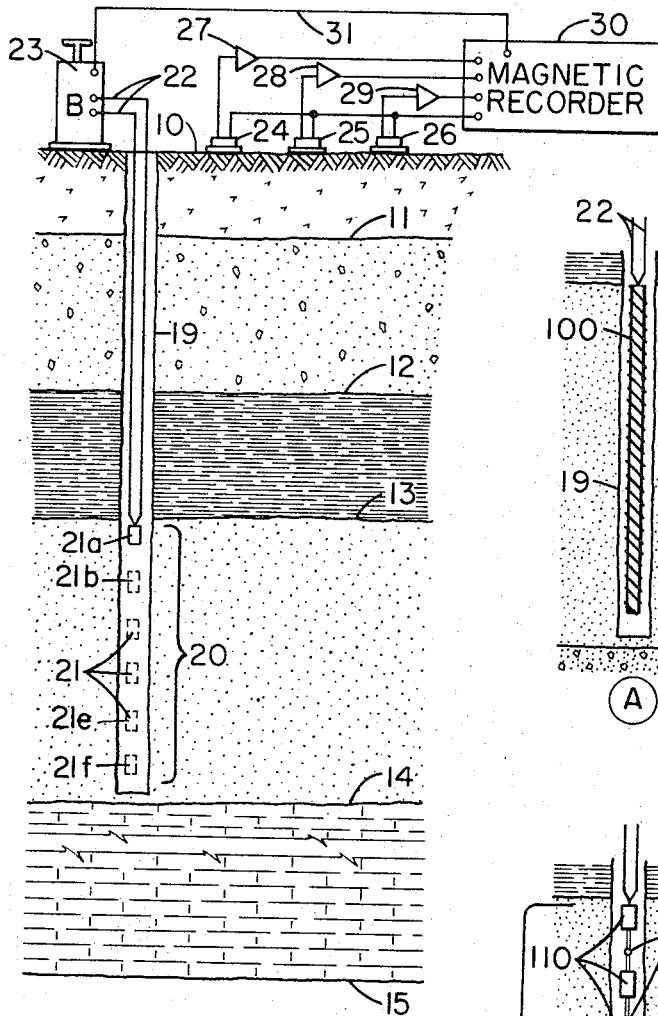
FIGURE 1 shows diagrammatically an earth cross-section with apparatus for recording data used in applying the invention.

Referring now to these drawings in detail and particularly to FIGURE 1 thereof, this figure shows diagrammatically a cross-section of the earth, including the ground surface 10 and subsurface reflection interfaces 11, 12, 13, 14 and 15. In addition to the ground surface 10, the interface 11, which may be the base of the weathered layer, and the interfaces 12 and 13 are considered likely to reflect seismic compressional-wave energy with sufficient amplitude to give rise to multiple reflections that may interfere with or obscure the desired primary reflections from deeper interfaces such as 14 and 15. For the purpose of obtaining data to be utilized in this invention, a hole 19 is drilled from the ground surface 10 to a depth below interface 13 sufficient to provide a substantial length of hole 20 wherein seismic waves are to be generated, for example by successively detonating an explosive charge 21 at each of a plurality of spaced points within the interval 20. The uppermost position for charge detonation is shown as occupied by a charge 21a, the positions at which additional charges 21 are to be detonated being shown in dotted outline, with the bottom or lowermost charge position designated 21f. For detonating charge 21a, electrical leads 22 extend to a blaster 23 at ground surface 10. Also at ground surface 10 near the top of hole 19 are seismometers 24, 25 and 26, respectively connected through amplifiers 27, 28 and 29 to a magnetic recorder 30 which records a separate magnetic trace for each seismometer signal in a manner conventional in the seismic field recording art. The showing of three seismometers 24, 25 and 26 is only by way of example, as any desired number may be employed, singly or interconnected as a group. In the description to follow, only seismometer 24 will be referred to, but it is to be understood that the separate signals of seismometers 25 and 26 may be similarly analyzed. A connecting lead 31 between blaster 23 and recorder 30 transmits the time-break signal to the recorder for indicating the instant of detonation of charge 21a, along with a timing signal indicating the passage of time during the recording, all in a manner conventional in the seismic recording art.

In operation, a first magnetic record is made of the seismic waves received at the ground surface 10 by detonating a charge 21f at the lowermost position. Subsequently, a second explosive charge is prepared and lowered to position 21e, where it is then detonated and a second recording is made. Likewise, successive charges are prepared and lowered to successively higher positions in the bore-hole interval 20, the last charge being lowered to and detonated at position 21a. Detonation of the charges in this order reduces the likelihood of caving of the borehole preventing charge placement at the desired depths. Although six successive charge positions have been illustrated in the interval 20 of FIGURE 1, this is for illustrative purposes only, and any desired greater or lesser number of individual charges can be utilized as desired in carrying out the invention.

Figure 2:
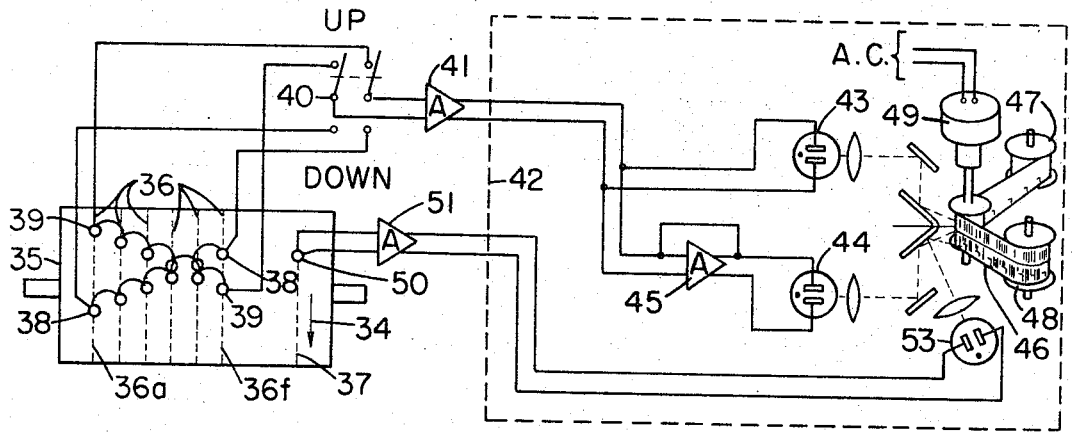
FIGURE 2 is a schematic wiring diagram of apparatus for separating the received waves into upward and downward directional wave functions.

Referring now to FIGURE 2, this figure shows diagrammatically one embodiment of apparatus for separating the waves received by one of the detectors, for example detector 24, into two directional-wave functions. The multiple-trace magnetic record produced by magnetic recorder 30 is shown as a playback drum 35 carrying six traces 36 corresponding to the waves received by the single transducer 24 from the detonations of the six charges 21f to 21a, and trace 37 which is the timing trace. For simplicity, it may be assumed that each trace 36 includes the time-break corresponding to the instant of detonation of each corresponding charge 21 and that the time-breaks are aligned across drum 35. Two arrays of moveable playback heads 38 and 39 are positioned adjacent drum 35 to reproduce the respective traces 36. The heads of array 38 are connected in series and to one terminal pair of a double-pole double-throw switch 40, while the heads of array 39 are similarly connected in series and to the other fixed terminals of switch 40. The moveable arms of switch 40 are connected to the input of a playback and re-record amplifier 41, the output of which drives the recording elements of a variable-density film recorder 42.

Recorder 42 may include a first modulated glow tube 43 directly connected to the output of amplifier 41 and a second modulated glow tube 44 connected to amplifier 41 through an inverting amplifier stage 45. The oppositely varying illumination provided by glow tubes 43 and 44, in accordance with the two polarities of signal current applied thereto by amplifier 41, is directed by suitable lens and mirror arrangements onto a perforated photographic film strip 46 drawn from a supply reel 47 and delivered to a take-up reel 48 by a driving sprocket actuated by a constant-speed motor 49. Timing trace 37 is reproduced by a pickup head 50 through a reproducing and re-record amplifier 51 modulating the light output of a glow tube 53, for recording the timing trace in variable-density form on film 46.

Figure 3:
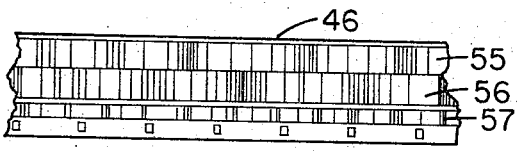
FIGURE 3 shows the appearance of a film recorded by the apparatus of FIGURE 2.

FIGURE 3 shows more clearly the form of recording produced by recorder 42. The output signal from amplifier 41 is recorded as two side-by-side variable-density traces 55 and 56, one being the exact inverse of the other, as determined by inverting amplifier 45. The variable-density trace 57 is that produced by glow tube 53 from the timing signal of trace 37, which is conventionally a constant-frequency sine wave of 100 cycles per second.

In operation, it will be assumed that the surface of drum 35 moves in the direction indicated by arrow 34. The individual heads of reproducer head array 38 are shifted along the direction of traces 36 in the manner shown on the drawing, so that the relative time-delay decreases according to seismic-wave travel times downwardly through the borehole interval 20, from the position of charge 21a to the position of charge 21f. That is, assuming that trace 36a is that representing the seismic waves received by seismometer 24 from the detonation of charge 21a, while trace 36f similarly represents the waves from charge 21f, then the relative time delay along transducer array 38, starting from a maximum for trace 36a equal to the seismic-wave travel time over the interval 20, decreases proportionately for the intermediate charge positions, becoming zero for trace 36f. The summation signal transmitted through switch 40 in its "DOWN" position to amplifier 41 is therefore a directional-wave function equivalent to the signal that seismometer 24 would receive from a velocity-matching array of six explosive charges detonated from the top downwardly through the borehole length 20.

As is well known in the seismic surveying art, such a charge array minimizes initial down-reflections of seismic-wave energy from interfaces above the charge and emphasizes the primary reflections from interfaces below the charge. Accordingly, this "first" directional-wave function, which is the summation signal of reproducer head array 38 represents at least in its beginning portion, the earth-reflectivity function below interval 20, convolved with the shot-plus-reception operator, and with the filtering effect of the near-surface layering.

In an analogous way, a "second" directional-wave function is derived from traces 36 by summing the outputs of reproducer head array 39, set to have the opposite relative time delays to array 38, and with switch 40 in its "UP" position. That is, starting with a maximum relative time-delay, equal to the seismic-wave travel time over interval 20, applied to trace 36f corresponding to shot position 21f, the relative delay decreases proportionally for traces made from shot positions thereabove, becoming zero for trace 36a from shot position 21a. Thus, the summation signal output of reproducer head array 39, which is the second directional-wave function, is equivalent to the signal produced at seismometer 24 by detonating a velocity-matching array of six spaced charges from the bottom upwardly. This second directional-wave function thus represents primarily the multiple reflections that are produced by initially up-traveling energy that is down-reflected by interfaces 10, 11, 12 and 13, and it is thus an indicator of the reflectivity function of these interfaces convolved with the shot-plus-receptor operator and with the filtering effect of the near-surface layering, which last is responsible for the most troublesome multiple reflections in the later portions of the first directional-wave function.

The variable-density traces 55, 56 recorded by recorder 42 with switch 40 in its "DOWN" position accordingly represent the "first" directional-wave function, while the variable-density traces 55, 56 recorded by recorder 42 with switch 40 in its "UP" position represent the "second" directional-wave function. These functions, however, include direct-wave arrivals from interval 20 that are responsible for primary reflections so that, for convolution to product only events that correspond to multiples, it is necessary to modify them in some manner to remove or otherwise omit the first arrivals from source 20 at detector 24, preferably for both of the directional-wave functions. This may be done simply by manually placing an opaque coating or tape on traces 55 and 56 of film 46 at the observed times of the first arrivals as determined from the time break on trace 57. In accordance with this invention, these are the two modified directional-wave functions that are to be convolved to obtain a trace representing multiple-reflection travel times.

Figure 4:
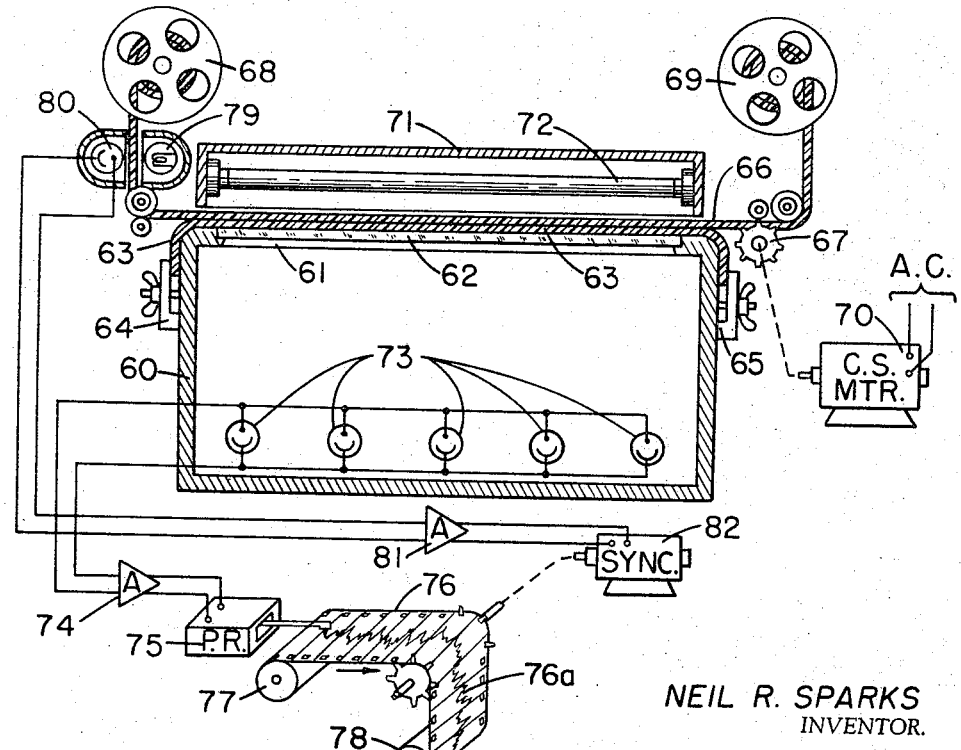
FIGURE 4 shows diagrammatically and partially in cross-section an apparatus for performing convolution operations in accordance with the invention.

In FIGURE 4 is shown diagrammatically and partially in cross-section, one form of apparatus for performing this convolution operation, after photographic processing of the exposed film 46 and the removal of first breaks have been completed. This apparatus comprises an enclosure or box 60 which is light-tight except for an elongated slit 61 covered by a strip of glass 62. The length of slit 61 is sufficient to span the entire time duration of one of the two directional-wave functions to be convolved, as it is recorded on film 46. The width of slit 61 is just equal to the combined width of traces 55 and 56, and edge-guiding means (not shown) are provided for film 46 to keep slit 61 and the two traces 55 and 56 in register throughout their length. One strip 63 of film 46, containing one of the two functions to be convolved, is placed over slit 61 in contact with glass 62 and is held stationary by clamps 64 and 65. The other film strip 66, bearing the other function to be convolved and oriented to superimpose is track 55 over the track 56 of strip 63, is arranged to be moved lengthwise by engagement with a sprocket 67 driven by a constant-speed motor 70, to draw strip 66 from a supply reel 68 to a pickup reel 69.

In a housing 71, close to and immediately above the film strips thus in contact, and adapted to pass illumination through both strips and through slit 61 into box 60, is an elongated light source 72 such as a fluorescent tube. The interior of enclosure or box 60 is preferably covered with a white or other reflective coating, and on its opposite side facing the slit 61 is an array of photocells 73. These photocells are connected together and to an amplifier 74, the output of which drives a pen recorder 75 marking, on a chart 76 drawn from a supply spool 77 to a takeup spool 78, a trace 76a varying with the total illumination received by the photocells 73. The movement of chart 76 is controlled from timing trace 57, which is scanned by a light source 79 illuminating a photocell 80, as film 66 is drawn from supply spool 68, the timing signal from photocell 80 being amplified as required, by an amplifier 81 to drive synchronous motor 82 connected to the drive mechanism of chart 76.

The manner in which this apparatus performs the function of multiplying and integrating the variable-density traces 55 and 56 of the respective film strips 63 and 66 is substantially in accordance with the teaching of U.S. Patent 2,839,149 of R. G. Piety. Although this patent shows superimposing a variable-area and a variable-density film, with the film divided into positive and negative areas having inverse light transmission characteristics, it will be apparent that two variable-density films superimposed in contact with each other will provide precisely the same multiplication and integration effect as will the variable-area and the variable-density films shown by Piety.

Whether the apparatus of FIGURE 4 performs a mathematical correlation or convolution operation depends upon the end-to-end orientation of the films 63 and 66. If the events recorded on both films run in the same direction in time sequence (for example, from left to right as viewed in FIGURE 4), then the movement of film 66 in either direction performs a correlation operation, with the film movement being proportional to delay time. To perform a convolution, it is necessary that the time sequence of the events on the films (as viewed in FIGURE 4) run in opposite directions. Assuming that on film 63 time runs from left to right, then film 66 is to be oriented so that time runs from right to left, and it is preferred that film 66 be moved from left to right past stationary film 63, with zero time for the convolution trace on chart 76 starting when zero times for the respective traces of films 66 and 63 are in coincidence. It is preferred also, but not essential, that these zero times be corrected to the ground surface 10 as a reference datum.

In operation, therefore, the convolution trace 76a is plotted in any desired visible form that is convenient for comparison with the directional wave function corresponding to the summation trace recorded with switch 40 of FIGURE 2 in its "DOWN" position. That is, it is preferred that both convolution trace 76a and the first directional-wave function be plotted with the same form and time scale. Multiple reflections then become recognizable in the directional-wave function by their time coincidence in both compared traces, whereas prominent events that appear only in the directional-wave trace but not in the convolution trace may with reasonable assurance be interpreted as primary reflections.

Alternatively, or in addition, the discrimination of the multiple reflections may be aided by preparing a visible-trace display as described in my copending joint patent application Serial Number 429,427 filed Feb. 1, 1965, with Daniel Silverman as joint inventor. Briefly, as is there described, the two traces to be visually compared, while in the form of corresponding electrical signals, are subtracted with different relative ampltiudes, and the resulting difference or remainder traces are displayed, preferably in some progressive order of arrangement of the relative amplitudes, as an array of side-by-side visible traces. Multiple reflections are then recognizable by their varying amplitudes, which on one trace will ordinarily approach zero or substantially complete cancellation, or even may reverse phase or polarity across the display-trace array. Primary reflections, on the other hand, are strongly emphasized because they do not change amplitude or polarity, but tend to remain of constant amplitude across the display-trace array.

Figure 5:
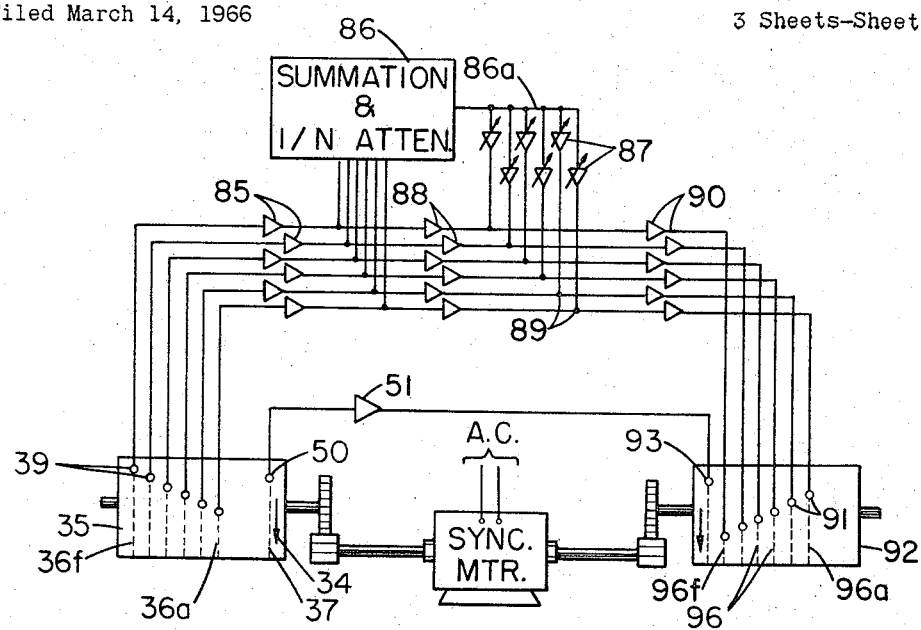
FIGURE 5 is a schematic wiring diagram of a modified form of apparatus for separating the received waves into upward and downward directional wave functions.
Figure 6:
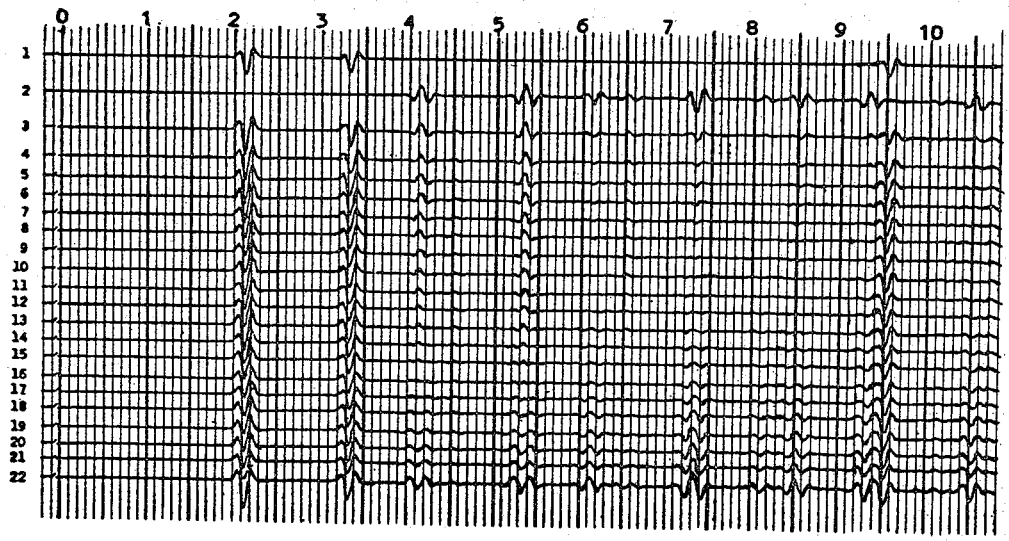
FIGURE 6 is a reproduction of a portion of a record showing results obtained according to the invention, utilizing an assumed example.

While the separation of the waves received by detector 24 into the two directional-wave functions is quite effective when performed in the manner illustrated in FIGURE 2, especially when a fairly large number of individual shots 21 are employed, a still more complete and efficient separation into directional-wave functions may be carried out in accordance with the teachings of U.S. Patent 3,223,967 of C. C. Lash. FIGURE 5 accordingly shows what is frequently a preferred embodiment of this invention, wherein the principles of that patent, and particularly of its FIGURE 6, are utilized. Briefly stated, to determine the form of the directional-wave function for each particular one of the shots 21a to 21f, the form of the opposite directional-wave function is determined utilizing the entire group of shots as a unit, and this directional-wave function with the proper relative amplitude is then subtracted from the waves received due to each individual shot 21. This gives, for each shot depth, a resultant remainder trace that is more nearly a directional-wave function, in the "single-direction" sense, than is true where the directional-wave function is produced solely by summation. Conversely, a directional-wave function in the "opposite" direction sense is produced for each shot depth by subtracting from each trace of the detector 24, the attenuated summation for propagation of the charge detonations in the relatively opposing direction.

This is more clearly shown by FIGURE 5 where the individual playback heads 39, relatively time-delayed to simulate downward velocity-matching detonation propagation over the charge array in the interval 20, have their outputs separately amplified by amplifiers 85, to produce six separate signals rather than a single output signal as in FIGURE 2. Suitable connections from the outputs of amplifiers 85 go to a summation and attenuation network 86, which produces on an output lead 86a a signal that is the sum of the indvidual input signals received from amplifiers 85. This essentially is the same as the "DOWN" signal produced by array 38 in FIGURE 2, with switch 40 in "DOWN" position. The output on lead 86a is preferably also attenuated by the factor $1/N$, N in this case being six corresponding to the number of individual charges 21 and corresponding recorded traces 36, so that the events in the summation signal on lead 86a and in the individual signals themselves are of similar amplitude. By amplifiers 87, adjustable to compensate for any slight inequalities between signal channels, the attenuated summation signal of lead 86a is applied to junction points 89 of the respective signal-carrying channels, with the polarity of the connection at each point 89 being such as to produce subtraction. Buffer amplifiers 88 in the signal-carrying leads prevent feedback from the junction points 89 to the input leads of the summation and attenuation network 86. The resulting remainder or difference voltage for each signal channel, amplified by a corresponding amplifier 90, is recorded by one of an array of recording heads 91 on a rotating magnetic drum 92, as a corresponding one of traces 96 respectively representing an "UP" directional-wave function for each particular shot depth 21. The timing signals of trace 37 on drum 35 are transferred by playback amplifier 51 to a recording head adjacent drum 92. Preferably the recording heads 91 are arranged with the reverse set of time-delays relative to the delay pattern of playback heads 39, so that the seismic events of "UP" directional-wave function traces 96 (i.e., traces constituting essentially only the seismic waves that would result from upward propagation of detonation over the interval 20), are restored to the relative time relationship with which they were initially recorded on drum 35.

Next, by shifting playback heads 39 of FIGURE 5 into the relative position of heads 38 in FIGURE 2, so that the effect is obtained of upward propagation of detonation at a velocity matching formation seismic-wave propagation, a second set of "DOWN" difference traces (i.e., containing essentially only the seismic energy produced by downward velocity-matching detonation propagation) is obtained analogous to traces 96. It will be understood that the heads 91 may also be repositioned adjacent drum 92, so as to compensate the respective delays of heads 39 (shifted into the position of heads 38) and restore the seismic events in the second set of traces 96 (not shown) to their original time relationship. In this way, assuming for example six shot positions 21, six "UP" traces 96 of seismic waves corresponding to upward detonation propagation and six "DOWN" traces (not shown) of seismic waves corresponding to downward detonation propagation, are obtained. Each of the twelve resulting density trace pair 55, 56 on a film 46, by applying it along with the timing-trace signals, sequentially to the variable-density recorder 42 of FIGURE 2.

In this embodiment, the convolution step of the invention accordingly involves, for each shot depth 21, selecting the corresponding "UP" and "DOWN" directional-wave functions, blanking out the direct-wave arrivals and then convolving the two modified film strips in the manner shown in FIGURE 4. Upon repeating this convolution procedure for each of the six pairs of directional-wave functions, six convolution functions are obtained for comparison with the corresponding "DOWN" directional-wave functions, to detect for each of the six shot depths, which of the events in the latter functions are multiple reflections by their time coincidence in the compared traces. Alternatively, as was stated above, each convolution function may be subtracted from the corresponding "DOWN" directional-wave function with a plurality of different relative amplitudes, to produce an array of differences or remainder traces for visible display, at least one of which will be found to produce substantial cancellation of the multiple reflections in the directional-wave function.

In FIGURE 6 is shown a calculated example of a remainder-trace type of display, like that provided by this invention. Trace 1 of this figure is an assumed noise-free trace showing three primary reflections from three interfaces. Trace 2 is a convolution trace similar to that provided in the present invention, except that it is produced by convolving trace 1 with itself rather than by use of two different traces respectively corresponding to "UP" and "DOWN" detonation propagation through the borehole interval 20. Trace 3 is a computed trace showing all of the reflections, both primary and multiple, to be expected from the layering that produces the primary reflections of trace 1. According to one method of utilizing this invention, a simple visual comparison of traces 2 and 3 identifies which are the multiple reflections in trace 3 simply by the fact of their occurrence in time coincidence in trace 2.

According to the alternate way of utilizing the invention, traces 4 through 22 inclusive are prepared, representing the difference traces obtained by subtracting trace 2 from trace 3 with a large number of different relative amplitudes of trace 2. As is apparent from inspection of these traces, the primary reflection events preserve their character and amplitude across the entire trace array, whereas the multiple reflections, corresponding to the events on trace 2, vary in amplitude, becoming substantially zero and then reversing in phase across the trace display. Although complete cancellation of the multiple reflections occurs on different traces of the display for different multiple reflections, their variation in amplitude in the remainder waves across the display is itself an indication of the nature of these events as multiple reflections rather than primaries, for which the amplitude remains substantially constant.

Figure 7:
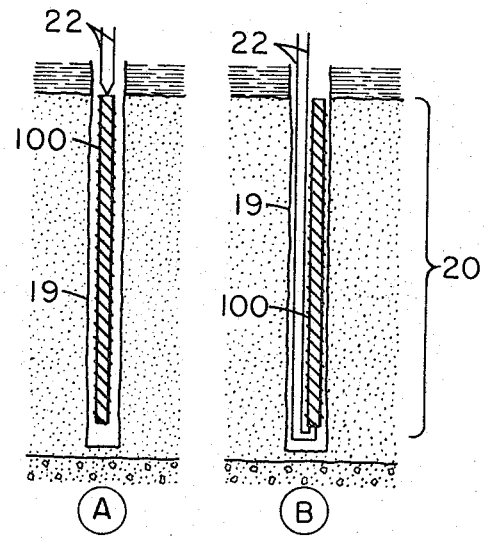
FIGURES 7 and 8 are partial cross-section views similar to FIGURE 1, of alternative forms of wave-generating means.

Instead of separately detonating each charge 21 of the array 21a to 21f, recording a separate trace of the resulting waves of each charge detonation as received by seismometer 24, and then producing the "UP" and "DOWN"

directional-wave functions by summing the recorded traces with two different sets of time delays, the directional-wave functions may be recorded directly as the output of the detector 24 in the manner illustrated by FIGURE 7. In particular, as shown in FIGURE 7A an elongated velocity-matching charge 100 of the type described in Silverman Patent 2,609,885, and constructed as described in Silverman Patent 3,150,590 may be lowered into bore hole 19 to extend through the interval 20. Upon then detonating charge 100 from the top downwardly as shown in FIGURE 7A, the first directional-wave function is produced directly as the output of seismometer 24, for recording by magnetic recorder 30 as a reproducible trace. Upon repeating this process as shown in FIGURE 7B, by lowering a second elongated charge 100 into bore hole 19 and detonating it from the bottom end upwardly, by extending leads 22 to the detonator at the lower end of charge 100, the second directional-wave function, corresponding to upward velocity-matching charge detonation, is produced directly as a recorded reproducible trace by recorder 30. These two traces are then directly converted to corresponding variable-density traces on film 46 by variable-density recorder 42 modified to remove first breaks, and convolved as in FIGURE 4, to produce a convolution trace for comparison with the "DOWN" directional-wave function produced according to FIGURE 7A.

Figure 8:
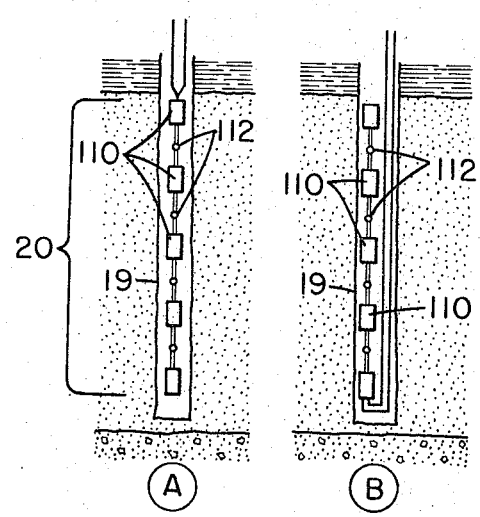

If more explosive power is desired than can conveniently by provided by the continuous charges of FIGURE 7, the directional-wave functions may then be generated as shown in FIGURE 8. As appears in FIGURE 8A, an array of spaced lump charges 110 containing any desired total weight of explosive, are inter-connected by delay connecters 112 of a type that is commercially available and well-known in the seismic art, to transfer the detonation from one charge unit 110 to the next unit, with small fixed time delays matching the seismic-wave propagation times in the surrounding formations of bore hole 19. Detonating this spaced-charge array from the top downwardly as shown in FIGURE 8A produces the "DOWN" or "first" directional-wave function directly in the same manner as does charge 100 in FIGURE 7A, while detonation from the bottom upwardly as in FIGURE 8B produces the "second" or "UP" directional-wave function directly in the same way as the continuous-charge detonation of FIGURE 7B. The resulting two recorded traces, as transcribed by variable-density recorder 42, modified to remove first breaks, and convolved by the apparatus of FIGURE 4 then produce the corresponding convolution trace for comparison with the "DOWN" trace, just as in the embodiments described previously.

While I have thus described several different ways of directional-wave function generation, or of deriving directional-wave functions corresponding thereto from waves generated by non-directional means, those skilled in the art of seismic surveying will understand that still further means of generating directional seismic-wave functions may be utilized in carrying out the invention. Also, while the invention has been described with reference to the foregoing specific embodiments and illustrations, it will be apparent to those skilled in the art that the principles of the invention can be employed to accomplish its objects in a number of further and different ways not disclosed in detail. The scope of the invention therefore should not be considered as limited to the embodiments and details described, but it is preferably to be ascertained from the scope of the appended claims.

I claim:
1. The method of discriminating primary and multiple seismic reflections in seismic geophysical surveying which comprises the steps of
 creating seismic waves successively along a given length of bore-hole in the earth below a plurality of down-reflecting interfaces likely to be involved in producing said multiple reflections,
 detecting the resulting seismic waves which arrive at a receiver generally vertically spaced from said given length of bore-hole,
 deriving from said detected waves first and second directional-wave functions respectively representing the seismic waves that would be received while moving the position of successive wave creation respectively downwardly and upwardly through said length of bore-hole, at a velocity substantially matching the compressional seismic-wave velocity in the adjacent earth formations,
 modifying said directional-wave functions by removing or omitting that portion corresponding to direct-wave arrival at said receiver from said bore-hole length,
 convolving said modified directional-wave functions to product a convolution function having events at times corresponding to multiple reflections, and
 utilizing said convolution function to produce a seismic visible-trace display wherein the multiple reflections in said first directional-wave function are discriminated by their time coincidence in said convolution and said first directional-wave functions.

2. The method of claim 1 in which said wave-creating step comprises separately detonating each of a plurality of explosive charges at a corresponding one of a plurality of points spaced throughout said bore-hole length.

3. The method of claim 2 in which said wave-detecting step comprises positioning said receiver generally above said bore-hole length, and
 reproducibly recording a plurality of traces each representing said resultant waves received from the detonation of a corresponding one of said charges.

4. The method of claim 3 in which said function-deriving step comprises reproducing said plurality of traces, and
 summing said reproduced traces with two different sets of relative time delays, one set decreasing proportionately to compressional seismic-wave travel times through the earth downwardly past the successive charge-detonation positions in said bore-hole length to produce said first directional-wave function, and the other set of relative time delays decreasing proportionately to compressional seismic-wave travel times upwardly past the successive charge-detonation positions in said bore-hole length, to produce said second directional-wave function.

5. The method of claim 1 in which said wave-creating and directional-wave function-deriving steps comprise:
 detonating a first explosive-charge array, extending through said bore-hole length, from the top downwardly with an effective detonation velocity substantially matching said compressional seismic-wave velocity to produce at said receiver said first directional-wave function directly, and
 detonating a second explosive-charge array, extending through said bore-hole length, from the bottom upwardly at said velocity-matching effective detonation velocity, to produce at said receiver said second directional-wave function directly.

6. The method of claim 5 in which said detonating steps comprise separately detonating two elongated, continuous velocity-matching explosive charges respectively from the top downwardly and from the bottom upwardly to produce, at said receiver, said first and second directional-wave functions directly.

7. The method of claim 1 in which said wave-creating step comprises separately detonating each of $n$ explosive charges at a corresponding one of $n$ shot points spaced through said bore-hole length,
 said detecting step comprises reproducibly recording $n$ traces each corresponding to the resulting seismic waves arriving at said receiver from the detonation of one of said charges,
 said first directional-wave function-deriving step comprises reproducing and summing said $n$ traces with first relative time delays decreasing proportionately to compressional seismic-wave travel times upwardly past said shot points to produce a first summation function, attenuating said summation function by the factor $1/n$, and subtracting said attenuated first summation function from each of said $n$ traces without changing said first relative time delays, to produce a first set of $n$ difference traces respectively representing for each of said $n$ shot points a corresponding DOWN directional-wave function, said second directional-wave function-deriving step comprises repeating said reproducing, summing, attenuating, and subtracting steps on said $n$ traces with second relative time delays decreasing proportionately with seismic-wave travel times downwardly past said shot points, to produce a second set of $n$ difference traces respectively representing for each of said $n$ shot points a corresponding UP directional-wave function, said modifying step comprises removing from said first and second sets of difference traces the events corresponding to direct-wave arrivals from said charge detonations, to produce first and second sets of $n$ modified traces each, said convolving step comprises convolving each trace of said first modified set with the corresponding trace of said second modified set, to produce $n$ convolution traces containing events at the times of seismic multiple reflections, and said utilizing step comprises comparing each of said $n$ convolution traces with the corresponding one of said first set of $n$ difference traces to discriminate multiple reflections by their time coincidence in said compared traces.

8. The method of claim 7 in which said utilizing step comprises, for each of said convolution and coresponding first difference traces, subtracting said traces with a plurality of different relative amplitudes, and visibly displaying, as an array of side-by-side traces, the resulting plurality of remainder traces, wherein said multiple reflections are characterized by varying amplitudes across said array.

References Cited

UNITED STATES PATENTS

| | | | |
|---|---|---|---|
| 2,740,945 | 4/1956 | Howes | 181—.5 X |
| 2,792,067 | 5/1957 | Peterson | 181—.5 |
| 3,223,967 | 12/1965 | Lash | 340—15.5 |
| 3,278,893 | 10/1966 | Silverman | 181—.5 X |

BENJAMIN A. BORCHELT, *Primary Examiner.*

R. M. SKOLNIK, *Assistant Examiner.*

UNITED STATES PATENT OFFICE
CERTIFICATE OF CORRECTION

Patent No. 3,339,176                                      August 29, 1967

Neil R. Sparks

It is hereby certified that error appears in the above numbered patent requiring correction and that the said Letters Patent should read as corrected below.

Column 5, line 38, for "product" read -- produce --; line 67, for "is", first occurrence, read -- its --; same line 67, for "56" read -- 55 --; column 8, line 15, before "density" insert -- traces is then converted to a corresponding variable- --; line 34, for "differences" read -- difference --; line 66, for "dif-" read -- different --; column 9, line 29, for "by", first occurrence, read -- be --; column 10, line 17, for "product" read -- produce --; line 70, for "through" read -- throughout --.

Signed and sealed this 6th day of August 1968.

(SEAL)

Attest:

Edward M. Fletcher, Jr.

Attesting Officer

EDWARD J. BRENNER

Commissioner of Patents